UNITED STATES PATENT OFFICE.

JAMES A. McLARTY, OF TORONTO, ONTARIO, CANADA.

PROCESS OF TREATING METALS.

1,079,787.  Specification of Letters Patent.  Patented Nov. 25, 1913.

No Drawing.   Application filed December 18, 1911. Serial No. 666,541.

*To all whom it may concern:*

Be it known that I, JAMES A. McLARTY, of the city of Toronto, in the Province of Ontario, Canada, have invented certain new and useful Improvements in Processes of Treating Metals.

This invention relates particularly to a process of treating metals and particularly copper for the purpose of imparting a greater degree of hardness thereto and removing impurities therefrom.

In this process I employ any suitable closed chamber into which the metal to be treated may be introduced and which is provided with any convenient means of heating. In this chamber the metal, in any convenient form, is heated to a suitable temperature and at the same time the chamber is filled with the gases arising from the decomposition by heat of a mixture of a carbohydrate, such as sugar, with a fatty hydrocarbon, such as the intestinal fat of animals. This mixture may be decomposed at a temperature lower than that at which carbon monoxid usually forms so that the gases of decomposition consist largely of hydrogen, gaseous hydrocarbons and watery vapor.

The oxygen in the chamber combines with the products of distillation leaving an atmosphere in the chamber composed principally of reducing gases, carbonizing gases, aqueous vapor and nitrogen. These gases act on the metal so as to eliminate such impurities as oxygen and sulfur, and it is thought that absorbed nitrogen is eliminated from the metal.

The hydrocarbon and carbo-hydrate employed may be either in contact with the metal or separated therefrom.

The metal will, as a rule, be heated only by contact with the hot gases and its temperature will, therefore, as a rule not be much above the boiling point of the fat used in the process, probably between 500° and 600° F., though I may use higher temperatures if found desirable.

What I claim as my invention is:—

1. A method of treating metals which comprises subjecting the same, in a heated state to the action of gases and vapors produced by heating a mixture including a carbohydrate and a fat to a temperature below that necessary to produce material amounts of carbon monoxid, said mixture being out of contact with said metal.

2. A method of treating metals which comprises subjecting the same to the vapor-form products obtained by heating a mixture including a fat and a carbohydrate to below the temperature necessary to produce carbon monoxid, the metal and the mixture being out of contact with each other.

3. A method of treating copper which comprises subjecting the copper, in a heated state to the action of the gases and vapors produced by heating a mixture of a carbohydrate and a solid to a temperature below that necessary to produce carbon monoxid, said mixture being out of contact with said copper.

Toronto, Ontario, this 14th day of December, 1911.

JAMES A. McLARTY.

Signed in the presence of—
J. EDW. MAYBEE,
D. S. TOVELL.